United States Patent [19]

Kwoka

[11] Patent Number: 4,874,058
[45] Date of Patent: Oct. 17, 1989

[54] VISCOUS SHEAR COUPLING

[75] Inventor: Georg Kwoka, Siegburg, Fed. Rep. of Germany

[73] Assignee: Viscodrive GmbH

[21] Appl. No.: 222,276

[22] Filed: Jul. 21, 1988

[51] Int. Cl.$^4$ .................... B60K 17/348; F16D 31/06
[52] U.S. Cl. .................................. 180/248; 192/58 C
[58] Field of Search ................ 180/248, 249, 233; 192/58 C, 58 B

[56] References Cited

U.S. PATENT DOCUMENTS

| | | | |
|---|---|---|---|
| 4,046,239 | 9/1977 | Tinholt | 192/58 B |
| 4,605,087 | 8/1986 | Ashauer et al. | 180/244 |
| 4,721,010 | 1/1988 | Sheldon et al. | 74/665 T |
| 4,782,930 | 11/1988 | Kuroiwa et al. | 192/58 C |

FOREIGN PATENT DOCUMENTS

| | | |
|---|---|---|
| 86/02132 | 4/1986 | European Pat. Off. . |
| 3317247 | 11/1984 | Fed. Rep. of Germany . |
| 2199121 | 12/1987 | United Kingdom . |

*Primary Examiner*—John A. Pekar
*Attorney, Agent, or Firm*—Toren, McGeady & Associates

[57] ABSTRACT

A viscous shear coupling includes a housing and a hub, the hub with and housing having interleaved plates and the housing containing viscous liquid. A screw pump is provided to pump the viscous liquid into and out of the portion of the housing containing the plates thus to vary the torque transmission of the coupling. The viscous coupling may be used in a motor vehicle driveline to provide a viscous transmission.

20 Claims, 6 Drawing Sheets

VISCOUS SHEAR COUPLING

FIELD OF THE INVENTION

This invention relates to viscous shear couplings. Viscous shear couplings in accordance with the invention have particular, but not exclusive, application in the drive transmission of motor vehicles. The invention is also concerned with four-wheel drive vehicles including such viscous shear couplings.

DESCRIPTION OF THE PRIOR ART

An example of a viscous shear coupling, which is described in GB-PS 1357106 (and in the corresponding U.S. Pat. No. 3,760,922 issued Sept. 25, 1973), comprises a housing part; a hub part within the housing part, the parts being relatively rotatable about a common axis; a viscous liquid in the housing part; and first and second sets of annular plates in the housing part, the plates of the first set being rotationally fast with the housing part and being interleaved with the plates of the second set which are rotationally fast with the hub part.

Another example of a viscous coupling is shown in European PS-0068309 (and in the corresponding U.S. Pat. No. 4,721,010 issued Jan. 26, 1988). In this coupling there is a housing part and first and second hub parts within the housing part, all the parts being relatively rotatable about a common axis. There are first, second and third sets of annular plates in the housing part, the plates of the first set being rotationally fast with the housing part and being interleaved with the plates of the second and third sets which are rotationally fast with the first and second hub parts respectively. There is a viscous liquid in the housing part.

Torque is transmitted between the housing part and the hub part(s) of the coupling due to shearing forces in the viscous liquid between adjacent plates. Viscous shear couplings are used, inter alia, in the drive transmissions of motor vehicles having four-wheel drive of the type known as a viscous transmission. In such a transmission there is a permanently driven axle and a viscous shear coupling is disposed in the drive to the wheels of a second axle thereof. For example, the vehicle may have a forwardly mounted engine, gearbox, and conventional drive arrangement to the vehicle front wheels, with an additional power output from the gearbox leading to a longitudinal drive line and the rear axle of the vehicle, the viscous shear coupling being disposed in such longitudinal drive line. As long as the wheels of the permanently driven front axle, due to a sufficiently high adhesion between tires and road surface, drives the vehicle with no or substantially no slip, there is practically no speed difference between the two parts of the viscous shear coupling, so that no torque is transmitted to the rear wheels. However, if one of the permanently driven front wheels spins due to lack of adhesion between tires and road surface, a speed difference occurs across the viscous shear coupling so that torque is transmitted to the rear wheels through the coupling. The rear wheels then participate in driving the vehicle.

In another example of a viscous transmission a viscous shear coupling as described in European PS-0068309 is used in the rear axle and serves both as a drive unit and as a rear-axle inter-wheel differential gear.

With such a viscous transmission, problems can occur under braking. If the vehicle is braked sharply or on a slippery surface so that the front wheels of the vehicle are locked, the action of the viscous shear coupling will be such as to attempt also to lock the rear wheels and this is undesirable since, if the rear wheels lock, lateral stability of the vehicle is impaired. Therefore it has been proposed to include a one-way clutch unit in a viscous transmission so that no torque is transmitted through the longitudinal drive line via the viscous shear coupling when the rear wheels overrun the front wheels (see for example U.S. Pat. No. 4,605,087 issued Aug. 12, 1986). Clearly to provide such an additional clutch unit is expensive and adds weight and complexity to the vehicle.

SUMMARY OF THE INVENTION

It is one object of the present invention to provide a viscous shear coupling which, by its design, has different torque transmitting characteristics according to which way torque is being transmitted through the unit. In particular, it is an object to provide a viscous shear coupling which, when there is relative rotation between the parts in one sense, builds up a high torque for driving purposes whereas, when there is relative rotation between the parts in the opposite sense, no torque or very little torque is transmitted through the coupling.

According to this aspect of the invention this object is achieved by a viscous shear coupling comprising a housing part; a hub part within the housing part, the parts being relatively rotatable about a common axis; a viscous liquid in the housing part; first and second sets of annular plates in the housing part, the plates of the first set being rotationally fast with the housing part and being interleaved with the plates of the second set which are rotationally fast with the hub part; pump means for the vicous liquid and communicating with the interior of the housing part and means connecting the pump means to the said parts so that the pump means is operated when there is relative rotation between said parts such that the pump means tends to fill the portion of the housing part containing the plates with the viscous liquid when the housing part and the hub part rotate relative to one another in one sense and tends to empty said portion of viscous liquid when said parts rotate relative to one another in the opposite sense.

The torque characteristics of the coupling are controlled, at least in part, by the fill factor of the portion of the housing in which the plates are located i.e. the percentage of the volume of said portion filled with liquid. Where high torque transmission is required the pump means is arranged to fill said portion of the housing thus increasing the fill factor. Also, because the plates act as a labyrinth seal, the pressure generated by the pump means may be used to move the plates together which will also increase the torque transmission of the coupling.

In the opposite sense of relative rotation between the parts, however, the pump means is arranged to reduce the fill factor of the portion of the housing containing the plates so that torque transmission is reduced, if desired to such an extent that there is substantially no connection between the two parts of the coupling.

It is an object of a second aspect of the invention to provide a viscous shear coupling which can operate not only as a drive unit as described above but also as an interwheel differential in an axle.

According to this aspect of the invention we provide a viscous shear coupling comprising a housing part, first and second hub parts within the housing part, all the parts being relatively rotatable about a common axis; a viscous liquid in the housing part; first, second and third sets of annular plates in the housing part, the plates of the first set being rotationally fast with the housing part and being interleaved with the plates of the second and third sets which rotationally fast with the first and second hub parts respectively; pump means for the viscous liquid and communicating with the interior of the housing part; means connecting the pump means to the housing part and to at least one of the hub part(s) so that the pump means is operated when there is relative rotation between the parts to which it is connected such that the pump means tends to fill the portion of the housing containing the plates with viscous liquid when the housing part and the respective hub part to which the pump means is connected rotate relative to one another in one sense and tends to empty said portion of viscous liquid when said parts rotate relative to one another in the opposite sense.

There may be first and second pump means, the first pump means being connected between the housing part and the first hub part and the second pump means being connected between the housing part and the second hub part.

Preferably the pump means is formed by cooperating elements of, or secured to, the housing part and the hub part respectively. The pump means is preferably a screw pump and the screw may be continuous or interrupted in the form of a propeller. Preferably the screw is formed as an element of the or a hub part and cooperates with the housing part to form the screw pump.

Preferably the housing part is formed as a cylinder of uniform cross section between its ends and the or each screw has an external diameter substantially equal to the external diameter of the plates of the second set and the third set if provided. There is thus a gap between the screw and the cylinder.

Preferably all the plates of the coupling are movable in directions parallel to the common axis although if desired only the plates of one set may be movable in a coupling of the first aspect of the invention and the plates of the first and second sets in a coupling of the second aspect of the invention. In such a construction, when the pump means acts to tend to fill the housing part the plates move together to increase the torque transmitted. Resilient means may be provided between adjacent plates of at least one of the sets of movable plates to urge such adjacent plates of the set away from one another. This has the effect of reducing the torque transmitted when the pump means is arranged to reduce the fill factor in the portion of the housing containing the plates.

It is an object of a third aspect of the invention to provide a motor vehicle having a viscous transmission as described above and including a viscous shear coupling according to the first or second aspect of the invention.

According to this aspect of the invention we provide a motor vehicle including a prime mover and a drive transmission having front and rear pairs of drivable wheels wherein, when the vehicle is being driven, the wheels of the front pair are driven directly and permanently from the prime mover via an inter wheel differential gear and the wheels of the rear pair are connected to the prime mover via one or more viscous shear couplings according to the first or second aspect of the invention, the viscous shear coupling or couplings being arranged so that if one or both of the rear wheels overrun both of the front wheels, the pump means of the viscous shear coupling or couplings connected to the overrunning wheel or wheels tends to empty said portion of the housing part containing the plates in the or each such coupling to reduce the torque transmitted by the or each such viscous shear coupling.

With this arrangement, should the front wheels be locked and the rear wheels tend to overrun the front wheels then the pump means tends to empty the portion of the housing part of the coupling containing the plates to reduce the torque so that there is no tendency for the locking of the front wheels to also lock the rear wheels. However, should the front wheels spin the viscous shear coupling(s) act to drive the rear wheels.

A viscous shear coupling can be placed in a propeller shaft between the front axle and a conventional rear axle. Alternatively the rear wheels may be driven through separate viscous shear couplings thus dispensing with the need to have a conventional rear axle differential. In the third arrangement a combined viscous shear coupling and differential according to the second aspect of the invention may be provided for the rear wheels.

BRIEF DESCRIPTION OF THE DRAWINGS

The invention will now be described in detail by way of example with reference to the accompanying drawings in which.

DETAILED DESCRIPTION OF THE INVENTION

Figure 1:
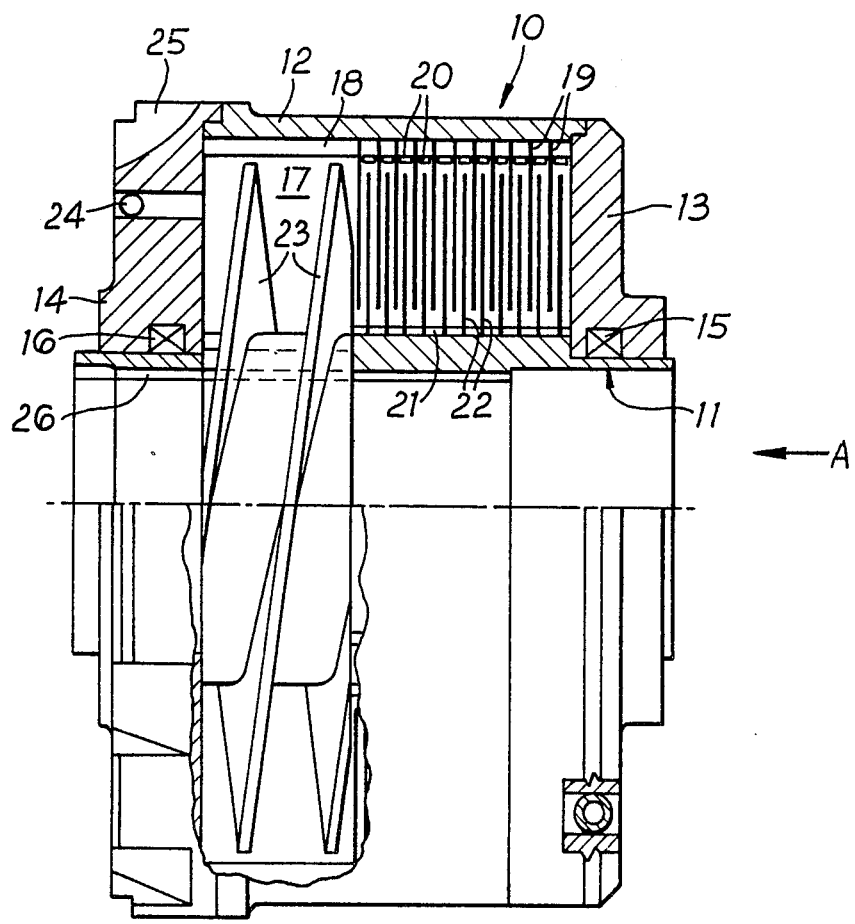
FIG. 1 is a cross section through a viscous shear coupling embodying the invention.

Referring first to FIG. 1, the viscous coupling there shown comprises a housing part 10 and a hub part 11. The housing part 10 comprises a cylindrical barrel 12 with end plates 13 and 1. The end plates carry seals 15 and 16 respectively which seal with surfaces on the hub part 11 as to provide a sealed enclosure 17. The end plates are welded to the barrel.

The barrel 12 is internally splined at 18 and has a first set of plates, some of which are indicated at 19, engaged with the splines. The plates may be of the shapes described for example in GB-PS-1357106. Between adjacent plates 19 are resilient members or springs 20 which tend to urge adjacent plate 19 apart. There is a spring 20 between each adjacent pair of plates 19.

The hub part is externally splined at 21 over its left hand portion and carries plates 22 of a second set which are interleaved with the plates 19, the plates 22 being engaged with the splines 21.

At its right hand end the hub part 11 is formed as a screw and has a helical formation 23 in the form of an uninterrupted screw or worm. It will be seen that the diameter of the screw or worm is substantially the same as the diameter of the plates 22 of the second set leaving a gap between the exterior of the screw and the interior of the barrel. The helical formation 23 and the surrounding part of the barrel 12 constitute pump means so that if there is relative rotation between the helical formation 23 and the barrel 12 viscous liquid within the barrel will be pumped either to the left or to the right in FIG. 1 depending on the sense of the relative rotation between the parts.

The housing part is provided in its interior with a viscous liquid and this may be introduced through a filling device 24.

The end plate 14 is provided with teeth 25 to enable the housing part to be connected to a driving or driven member and the hub part 11 is internally splined at 26 for a similar purpose. The viscous liquid will preferably be silicone oil of the type, for example, described in said GB-PS-1357106.

Figure 2:
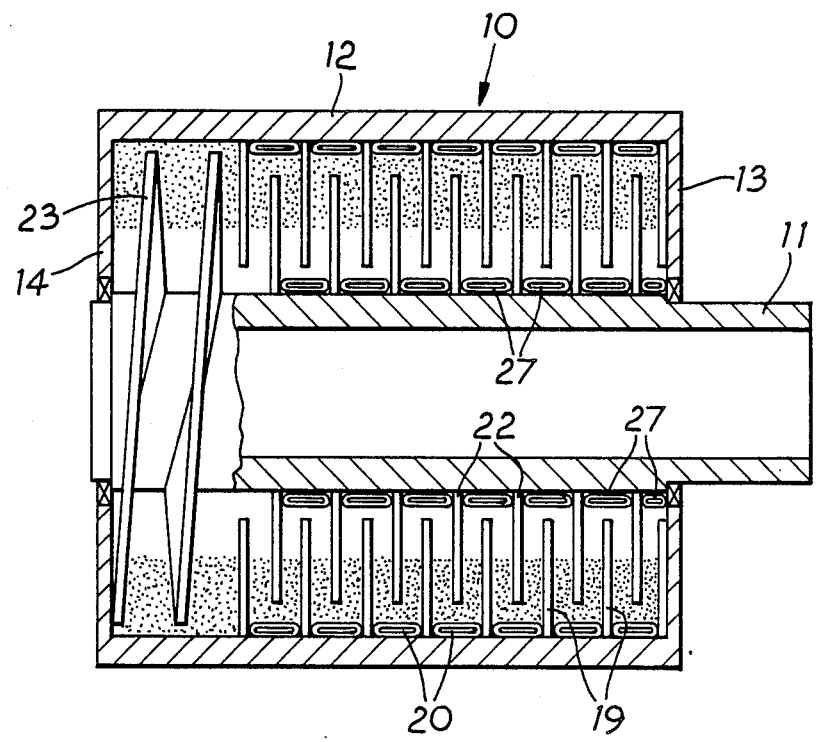
FIG. 2 is a diagrammatic section through the coupling of FIG. 1 showing it in a condition where it transmits least torque.

If one assumes that the housing part 10 remains stationary and the hub part 11 rotated in an anticlockwise sense as viewed in the direction of the arrow A, the screw will tend to move the viscous liquid in the housing from the right hand end thereof to the left hand end thereof. This state is shown diagrammatically in FIG. 2. The viscous liquid has been moved towards the left in FIG. 2 and the resilient members 20 have pushed the plates 19 away from one another. FIG. 2 also shows resilient members or springs 27 between the plates 22 so that in this state the plates 19 and 22 are relatively widely spaced apart and the viscous liquid in the coupling has been withdrawn towards the left hand end of the housing part 10. There will thus be relatively little or no torque transmitted between the housing part 10 and the hub part 11.

Figure 3:
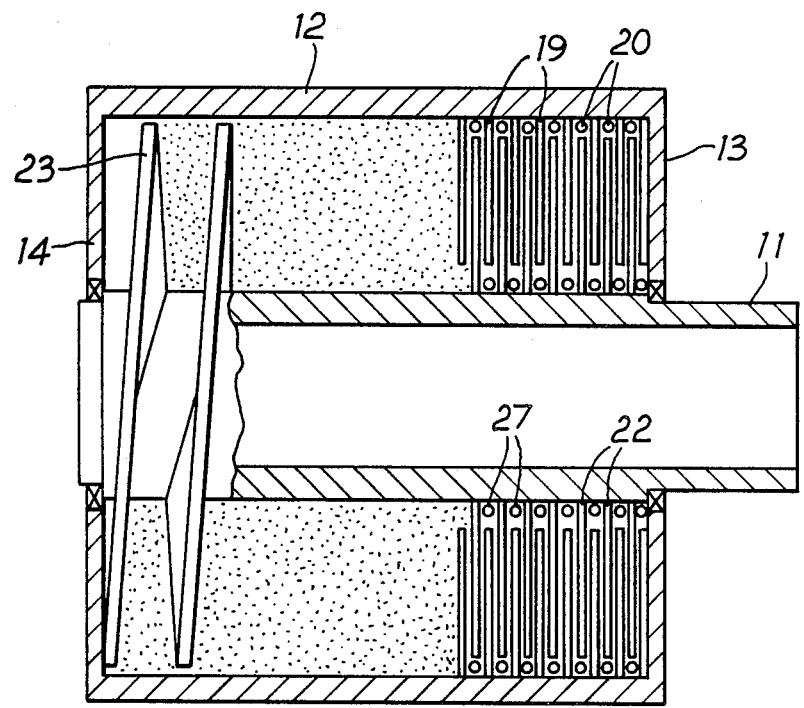
FIG. 3 is a diagrammatic view similar to FIG. 2 but showing the coupling in a condition in which it transmits maximum torque.

Conversely, if the housing part 10 is stationary and the hub part 11 rotates in a clockwise direction as viewed in the direction of the arrow A, there will be a tendency for the viscous liquid in the housing part to be moved to the right in FIG. 1. This has the effect of closing up the plates as shown in FIG. 3 because the plates act as a labyrinth seal and the increased pressure on the plates by the pump means consisting of the screw and the housing tends to close up the plates as well as to deliver the fluid to the right hand end of the housing. This state is shown in FIG. 3. In this state the springs 20, and 27 if provided, will be compressed as shown.

In this state the coupling will transmit the maximum torque because the plates are spaced relatively closely together and there is a maximum amount of liquid in the portion of the housing occupied by the plates.

It will be seen, therefore, that in one sense of relative rotation between the housing part 10 and the hub part 11 there will be a tendency for the portion of the housing part containing the plates to be filled with viscous liquid and the maximum torque to be transmitted with the plates being forced together. Conversely in the opposite sense of relative rotation between the parts 10 and 11 the screw pump will tend to empty the portion of the housing containing the plates so that a minimum torque will be transmitted.

Figure 4:
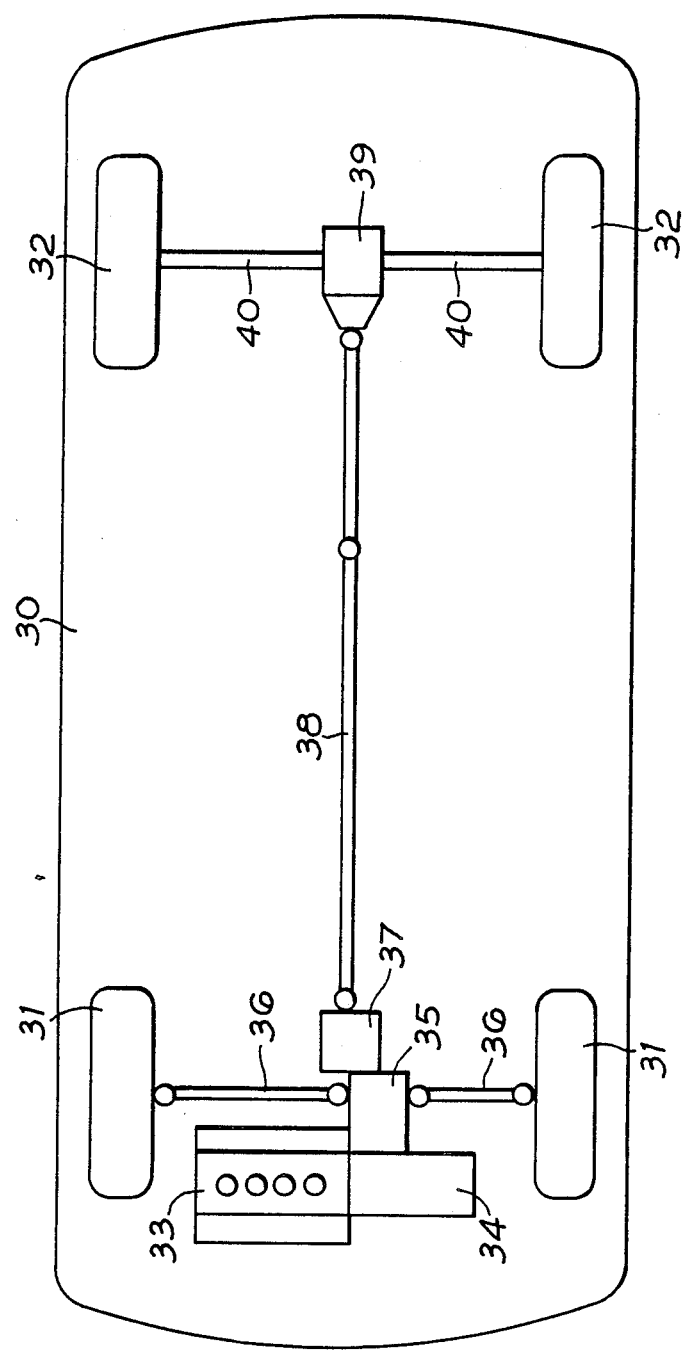
FIG. 4 is a diagram illustrating the use of the coupling in a four-wheel drive vehicle.

One way in which a coupling as described in FIGS. 1 to 3 can be used is shown diagrammatically in FIG. 4. In this figure, a motor vehicle is shown at 30 having a pair of front wheels 31 and a pair of rear wheels 32. A prime mover 33 drives a gear box 34 which drives an inter wheel gear type differential 35. The outputs from this differential are connected to drive shafts 36 which drive the wheels 31. A viscous shear coupling 37 as described in relation to FIGS. 1 to 3 is also driven from the gear box 34 and drives a propeller shaft 38, the other end of which is connected to the input of a gear type inter wheel differential gear 39. The outputs from the differential gear 39 are connected by drive shafts 40 to the rear wheels 32.

Normally the vehicle is driven by the front wheels 31. Should however one or both of the front wheels begin to slip with respect to the rear wheels 32 there will be a speed difference across the viscous coupling 37 and torque will be transmitted from the prime mover to the rear wheels 32 via the differential gear 39. Thus the coupling is arranged so that if one or more of the front wheels tends to overrun the rear wheels the pump means comprising the screw gear and housing will operate to put the coupling in the state shown in FIG. 3 so that torque will be transmitted to the rear wheels.

However should the front wheels lock so that one or more of the rear wheels 32 tends to overrun the front wheels 31 then the relative sense of rotation between the parts of the coupling will reverse and the coupling will assume the position shown in FIG. 2 so that minimum torque will be transferred from the front wheels to the rear wheels so that there will be no danger of the rear wheels 32 locking with consequent instability of the vehicle.

Thus this desirable end is achieved without having to provide a separate free wheel coupling as in the prior art arrangements.

Figure 5:
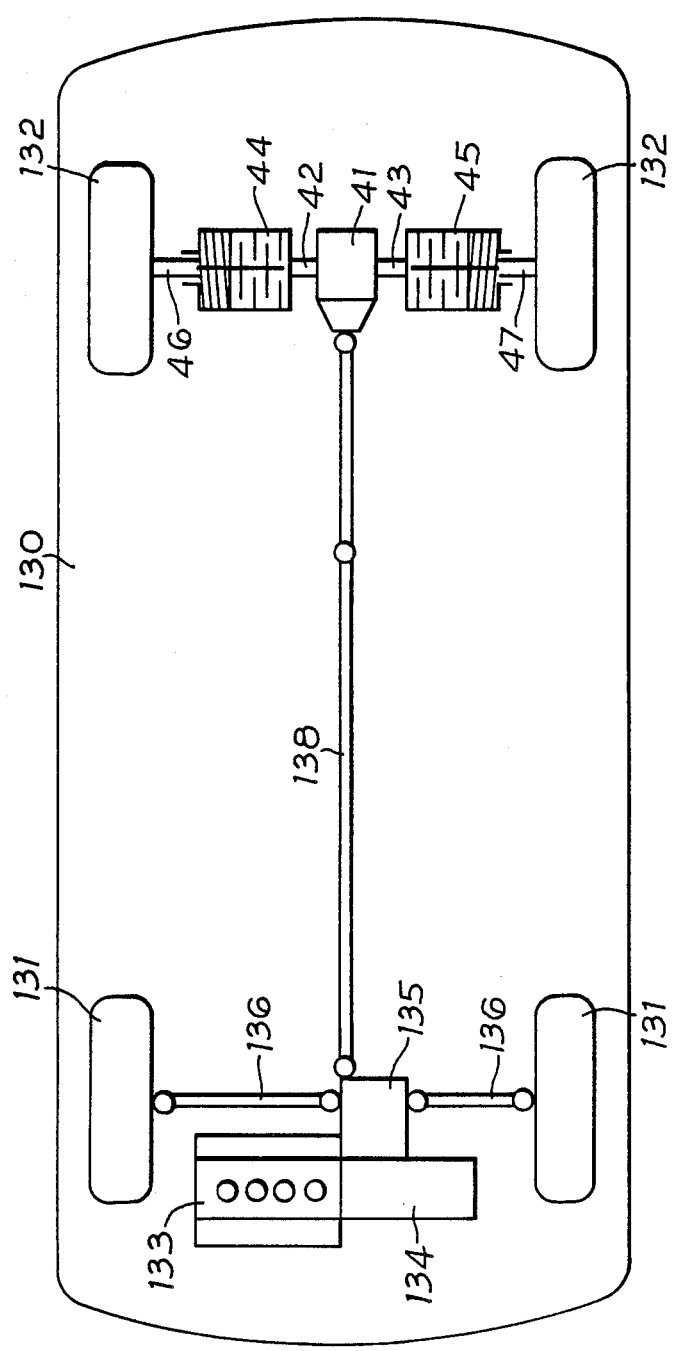
FIG. 5 is a view similar to FIG. 4 but showing a different application of the coupling in a four-wheel drive vehicle.

A further arrangement is shown in FIG. 5 where corresponding parts to those in FIG. 4 have the same reference numerals with a prefix 1. In this arrangement the front wheels 131 are driven as before from the differential gear 135 but the propeller shaft 138 is driven directly from the prime mover 133.

The propeller shaft 138 drives a final drive gear 41 such as a crown wheel and pinion and this drives, through shafts 42 and 43, two viscous shear couplings 44 and 45 respectively of the type shown in FIGS. 1 to 3. The housing parts of the couplings are driven by the shafts 42 and 43. The hub parts of the couplings 44 and 45 are connected by shafts 46 and 47 respectively to the rear wheels 132.

If there is no slip of any of the wheels the vehicle is driven by the front wheels 131. Should one or both of these begin to slip then the shafts 42 and 43 will be driven via the propeller shaft 138 and the final drive 41 at a greater speed than the shafts 46 and 47. The couplings 44 and 45 are arranged in this case to assume the state shown in FIG. 3 and thus apply torque to the rear wheels 132.

However, should the front wheels 131 lock and either of the rear wheels 132 begin to overrun the wheels 131 then the coupling 44 or 45 connected to such rear wheel is arranged so that the coupling takes up the state shown in FIG. 2 and therefore the overrunning rear wheel is not supplied with torque from the front wheels via the drive 41 and the propeller shaft 138.

Figure 6:
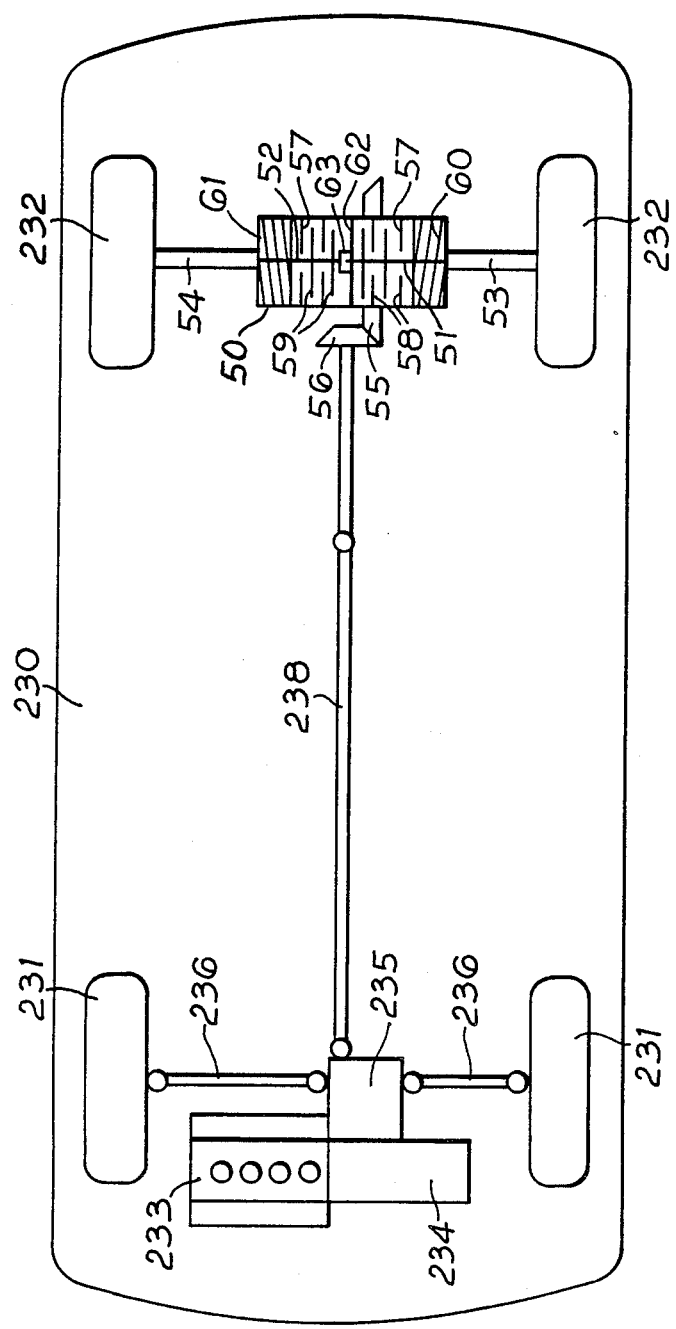
FIG. 6 is a diagrammatic illustration showing a still further application of the coupling in a four-wheel drive vehicle.

FIG. 6 shows a still further arrangement using a viscous coupling embodying the invention and corresponding parts in FIG. 6 to those in FIG. 4 are designated by the same numbers with the prefix 2. In this arrangement the prime mover 233 drives the front wheels 231 through the gear box 234 and differential gear 235 and also drives the propeller shaft 238.

However the propeller shaft drives the housing part 50 of a viscous shear coupling which has first and second hub parts 51 and 52 respectively which are connected via shafts 53 and 54 to the rear wheels 232. The housing 50 is driven by a crown wheel and pinion 55/56 from the shaft 238.

Within the housing part 50 of the viscous shear coupling there are three sets of plates. The plates 57 of the first set are rotatably fast with the housing 50 and are interleaved with plates of the second and third sets which are connected to first and second hub parts 51 and 52. The plates connected to the hub part 51 are indicated at 58 and those connected to the hub part 52 at 59. The hub part 51 carries a screw 60 and the hub part 52 carries a screw 61. A wall 62 across the housing part 50 separates the part into two portions. The wall carries a bearing 63 allowing relative rotation between the hub parts 51 and 52.

The general construction of the viscous coupling without the screw parts and the wall 62 is shown for example in European PS-b 0068309 (and the corresponding U.S. Pat. No. 4,721,010 issued Jan. 26, 1988) to which reference should be had. The screws 60 and 61 cooperate with the housing part 50 to provide first and second pump means. The arrangement is such that if the front wheels begin to slip the housing part 50 will overrun the hub parts 60 and 61 and the first and second pump means will pump the viscous liquid in the housing into the centre and this will tend to push the plates of the first and second and the first and third sets together and fill the space between them so that maximum torque transmission will take place.

If, however, one or other of the rear wheels 232 tends to overrun the front wheels 231 as a result of the latter locking then the respective pump means associated with the overrunning wheel will operate to tend to pump the viscous liquid out from the center of the housing 50 so that the overrunning wheel will not be locked.

It will be seen that the invention provides a viscous coupling whose torque transmission characteristics can be varied. It also provides a vehicle drive transmission for a four-wheel drive vehicle such that when there is locking of the front wheels this will not cause locking of the rear wheels. This is achieved without the necessity to have a separate free wheel device.

I claim:

1. A viscous shear coupling, comprising a housing part; a hub part within the housing part, the parts being relatively rotatable about a common axis; a viscous liquid in the housing part; first and second sets of annular plates in the housing part, the plates of the first set being rotationally fast with the housing part and being interleaved with the plates of the second set which are rotationally fast with the hub part; pump means for the viscous liquid and communicating with the interior of the housing part and means connecting the pump means to the said parts so that the pump means is operated when there is relative rotation between said parts such that the pump means tends to fill the portion of the housing part containing the plates with the viscous liquid when the housing part and the hub part rotate relative to one another in one sense and tends to empty said portion of viscous liquid when said parts rotate relative to one another in the opposite sense, the pump means is formed by cooperating elements on the housing part and the hub part respectively, and the pump means is a screw pump.

2. A viscous shear coupling as claimed in claim 1 wherein the screw is continuous.

3. A viscous shear coupling as claimed in claim 2 wherein the screw cooperates with the housing part to form the screw pump.

4. A viscous shear coupling as claimed in claim 3 wherein the housing part is formed as a cylinder of uniform cross section between its ends and the screw has an external diameter substantially equal to the external diameter of the plates of the second set.

5. A viscous shear coupling as claimed in claim 1 wherein the plates of at least one set of the coupling are movable in directions parallel to said common axis.

6. A viscous shear coupling as claimed in claim 5 wherein resilient means are provided between adjacent plates of at least one of the sets of movable plates to urge adjacent plates of the set away from one another.

7. A viscous shear coupling comprising a housing part, first and second hub parts within the housing part, all the parts being relatively rotatable about a common axis; a viscous liquid in the housing part; first, second and third sets of annular plates in the housing part; the plates of the first set being rotationally fast with the housing part and being interleaved with the plates of the second and third sets which are rotationally fast with the first and second hub parts respectively; wall means within and separating said housing into two portions with each said portion containing a different one of said second and third sets of annular plates; pump means for the viscous liquid and communicating with the interior of the housing part; means connecting the pump means to the housing part and to at least one of the hub parts so that the pump means is operated when there is relative rotation between the parts to which it is connected such that the pump means tends to fill the portion of the housing containing the plates with viscous liquid when the housing part and the respective hub part to which the pump means is connected rotate relative to one another in one sense and tends to empty said portion of viscous liquid when said parts rotate relative to one another in the opposite sense.

8. A viscous shear coupling according to claim 7 including first and second pump means, the first pump means being connected between the housing part and the first hub part and the second pump means being connected between the housing part and the second hub part.

9. A viscous shear coupling as claimed in claim 8 wherein each pump means is formed by cooperating elements on the housing part and each hub part respectively.

10. A viscous shear coupling as claimed in claim 9 wherein each pump means is a screw pump.

11. A viscous shear coupling as claimed in claim 10 wherein each screw is continuous.

12. A viscous shear coupling as claimed in claim 11 wherein each screw cooperates with the housing part to form a screw pump.

13. A viscous shear coupling as claimed in claim 12 wherein the housing part is formed as a cylinder of uniform cross section between its ends and each screw has an external diameter substantially equal to the external diameter of the plates of the second and third sets.

14. A viscous shear coupling as claimed in claim 7 wherein all the plates of the coupling are movable in directions parallel to said common axis.

15. A viscous shear coupling as claimed in claim 14 wherein resilient means are provided between adjacent plates of each set to urge them away from one another.

16. A motor vehicle including a prime mover and a drive transmission having front and rear pairs of drivable wheels wherein, when the vehicle is being driven, the wheels of the front pair are driven directly and permanently from the prime mover via an inter wheel differential gear and the wheels of the rear pair are connected to the prime mover via viscous shear coupling means comprising at least one viscous shear coupling including a housing part; a hub part within the housing part, the parts being relatively rotatable about a common axis; a viscous liquid in the housing part; first and second sets of annular plate in the housing part, the plates of the first set being rotationally fast with the housing part and being interleaved with the plates of the second set which are rotationally fast with the hub part; pump means for the viscous liquid and communicating with the interior of the housing part and means connecting the pump means to the said parts so that the pump means is operated when there is relative rotation between said parts such that the pump means tends to fill the portion of the housing part containing the plates with the viscous liquid when the housing part and the hub part rotate relative to one another in one sense and tends to empty said portion of viscous liquid when said parts rotate relative to one another in the opposite sense; the viscous shear coupling means being arranged so that if one or both of the rear wheels overrun both of the front wheels, the pump means of the viscous shear coupling connected to the overrunning wheel or wheels tends to empty said portion of the housing part containing the plates in the or each such coupling to reduce the torque transmitted by the or each such viscous shear coupling, and said pump means is a screw pump.

17. A motor vehicle according to claim 16 wherein the wheels of the rear pair are connected to the respective outputs of a gear-type, interwheel differential gear and wherein the input of such differential gear is connected to the prime mover via said viscous shear coupling means.

18. A motor vehicle according to claim 16 wherein each wheel of the rear pair is connected to the prime mover through a separate viscous shear coupling which constitutes said viscous shear coupling means.

19. A motor vehicle including a prime mover and a drive transmission having front and rear pairs of drivable wheels wherein, when the vehicle is being driven, the wheels of the front pair are driven directly and permanently from the prime mover via an inter wheel differential gear and the wheels of the rear pair are connected to the prime mover via a viscous shear coupling comprising a housing part, first and second hub parts within the housing part, all the parts being relatively rotatable about a common axis; a viscous liquid in the housing part; first, second and third sets of annular plates in the housing part, the plates of the first set being rotationally fast with the housing part and being interleaved with the plates of the second and third sets which are rotationally fast with the first and second hub parts respectively; wall means within and separating said housing into two portions with each said portion containing a different one of said second and third sets of annular plates; pump means for the viscous liquid and communicating with the interior of the housing part; means connecting the pump means to the housing part and to at least one of the hub parts so that the pump means is operated when there is relative rotation between the parts to which it is connected such that the pump means tends to fill the portion of the housing containing the plates with the viscous liquid when the housing part and the respective hub part to which the pump means is connected rotate relative to one another in one sense and tends to empty said portion of viscous liquid when said parts rotate relative to one another in the opposite sense; the viscous shear coupling being arranged so that if one or both of the rear wheels overrun both of the front wheels, the pump means of the viscous shear coupling connected to the overrunning wheel or wheel tends to empty said portion of the housing part containing the plates in the coupling to reduce the torque transmitted by the viscous shear coupling.

20. A motor vehicle according to claim 19 wherein the viscous coupling includes first and second pump means, the first pump means being connected between the housing part and the first hub part and the second pump means being connected between the housing part and the second hub part.

* * * * *

UNITED STATES PATENT AND TRADEMARK OFFICE
CERTIFICATE OF CORRECTION

PATENT NO. : 4,874,058

DATED : October 17, 1989

INVENTOR(S) : Georg Kwoka

It is certified that error appears in the above-identified patent and that said Letters Patent is hereby corrected as shown below:

In the heading of the Patent, it should read:

[30] Foreign Application Priority Data

July 29, 1987   Fed. Rep. of Germany ..... 3725103

Signed and Sealed this

Eleventh Day of December, 1990

*Attest:*

HARRY F. MANBECK, JR.

*Attesting Officer*   *Commissioner of Patents and Trademarks*